United States Patent
Zimmerman

(10) Patent No.: US 11,296,488 B2
(45) Date of Patent: Apr. 5, 2022

(54) PANEL MOUNT FOR MOUNTING SIGNALLING AND CONTROL DEVICES ON CONTROL PANELS

(71) Applicant: Floyd Bell, Inc., Columbus, OH (US)

(72) Inventor: Gary P. Zimmerman, Columbus, OH (US)

(73) Assignee: Floyd Bell Inc., Columbus, OH (US)

(*) Notice: Subject to any disclaimer, the term of this patent is extended or adjusted under 35 U.S.C. 154(b) by 94 days.

(21) Appl. No.: 16/828,342

(22) Filed: Mar. 24, 2020

(65) Prior Publication Data
US 2021/0305795 A1 Sep. 30, 2021

(51) Int. Cl.
*H02G 3/08* (2006.01)
*H02G 3/38* (2006.01)
*H02G 3/06* (2006.01)

(52) U.S. Cl.
CPC ........... *H02G 3/083* (2013.01); *H02G 3/0691* (2013.01); *H02G 3/286* (2013.01)

(58) Field of Classification Search
CPC ............ H02G 3/083; H02G 3/14; H02G 3/16; H02G 3/088; H02G 3/086; H02G 3/12; H02G 3/18; H02G 3/085; H02G 3/22; H02G 15/013; H02G 3/081; H02G 3/10; H02G 3/126; H02G 3/123; H02G 3/0616; H02G 3/0691; H02G 3/0418; H02G 3/0481; H02G 15/007; H02G 3/03; H02G 3/0456; H02G 3/386; H02G 15/113; H02G 15/16; H02G 1/08; H02G 3/0406; H02G 3/0675; H02G 3/08; H02G 15/04; H02G 1/06;
(Continued)

(56) References Cited

U.S. PATENT DOCUMENTS 2,592,130 A * 4/1952 Erb ................. F16B 21/065
  174/163 R
2,849,201 A   8/1958 Schelgunov
(Continued)

OTHER PUBLICATIONS

Gauge Panel with Rubber Isolators [online] product details [retrieved Jan. 3, 2020] retrieved from https://sealsit.com/product/gauge-panel-with-rubber-isolators-2-5-gauge/.
(Continued)

*Primary Examiner* — William H. Mayo, III
*Assistant Examiner* — Krystal Robinson
(74) *Attorney, Agent, or Firm* — Frank H. Foster; Kremblas & Foster

(57) ABSTRACT

A panel mount for supporting an electronic device at a hole in a control panel and mountable with access to only the front of the panel. It has a housing that slides into a tubular elastomeric grommet. During installation, an expander segment of the housing slides within a bulging segment of the grommet to expand the grommet inward of the hole and for retaining the components within the hole. A tubular male pre-assembly segment on the exterior surface of the tubular housing permits the housing to be pre-inserted partially into the grommet without expanding any part of the grommet radially outward in preparation for inserting the assembled housing and grommet into the panel hole. A withdrawal lock prevents the housing from sliding axially out of the grommet after installation. The withdrawal lock includes a shoulder formed on the grommet and a shoulder formed on the housing.

10 Claims, 5 Drawing Sheets

(58) Field of Classification Search
CPC ........ H02G 3/0493; H02G 3/06; H02G 3/105;
H02G 3/121; H02G 3/185; H02G 3/32;
H02G 1/00; H02G 3/0437; H02G 3/0625;
H02G 3/125; H02G 3/20; H02G 15/025;
H02G 15/085; H02G 15/10; H02G
15/115; H02G 1/10; H02G 3/0412; H02G
3/045; H02G 3/0468; H02G 3/0475;
H02G 3/0487; H02G 3/0608; H02G
3/0633; H02G 3/0666; H02G 3/0683;
H02G 3/30; H02G 3/34; H02G 3/38;
H02G 5/061; H02G 5/08; H02G 3/0658;
H02G 3/065; H02G 15/076; H02G 11/00;
H02G 15/046; H02G 15/06; H02G 15/08;
H02G 3/0641; H02G 3/383; H02G 1/14;
H02G 15/003; H02G 3/04; H02G 3/305;
H02G 7/18; B60R 16/0238; B60R
16/0207; B60R 16/0215; B60R 16/0222;
B60R 16/0239; B60R 16/03; B60R
16/033; H01B 17/308; H01B 17/30;
H01B 17/583; H01B 17/02; H01B 17/26;
H01B 7/08; H01B 17/306
USPC .................................................... 174/153 G
See application file for complete search history.

(56) References Cited

U.S. PATENT DOCUMENTS

| | | | |
|---|---|---|---|
| 3,016,562 A | 1/1962 | Reid | |
| 3,033,624 A | 5/1962 | Biesecker | |
| 3,434,746 A | 3/1969 | Watts | |
| 3,665,548 A * | 5/1972 | Mason | F16L 5/00 |
| | | | 174/153 G |
| 3,991,446 A * | 11/1976 | Mooney | H02G 3/0616 |
| | | | 411/548 |
| 4,128,107 A * | 12/1978 | Blumhardt | A01G 25/023 |
| | | | 137/318 |
| 4,481,930 A * | 11/1984 | Chadwick | F02M 5/12 |
| | | | 123/495 |
| 4,750,886 A | 6/1988 | Portelli et al. | |
| 4,757,664 A | 7/1988 | Freissle | |
| 4,927,287 A * | 5/1990 | Ohkawa | F16B 21/086 |
| | | | 24/297 |
| 4,939,934 A | 7/1990 | Ritzenthaler et al. | |
| 5,029,879 A * | 7/1991 | Strang, Sr | F16L 41/088 |
| | | | 277/606 |
| 5,850,640 A * | 12/1998 | Pinciaro | F16L 5/10 |
| | | | 4/541.6 |
| 5,894,093 A | 4/1999 | Ferguson et al. | |
| 5,920,924 A * | 7/1999 | Pinciaro | A61H 33/027 |
| | | | 4/541.6 |
| 6,453,484 B1 * | 9/2002 | Pinciaro | A61H 33/6063 |
| | | | 4/541.6 |
| 6,554,697 B1 | 4/2003 | Koplin | |
| 8,550,410 B2 | 10/2013 | Fraser | |
| 2012/0015555 A1 * | 1/2012 | Deimel | H05K 9/0018 |
| | | | 439/607.41 |
| 2012/0211274 A1 * | 8/2012 | Drotleff | H02G 3/0666 |
| | | | 174/360 |

OTHER PUBLICATIONS

Gauge Grommet Technical Specifications [online] [retrieved Jan. 3, 2020] retrieved from http://sealsit.northernlogics.com/wp-content/uploads/2016/06/GAUGE-GROMMET.pdf.

* cited by examiner

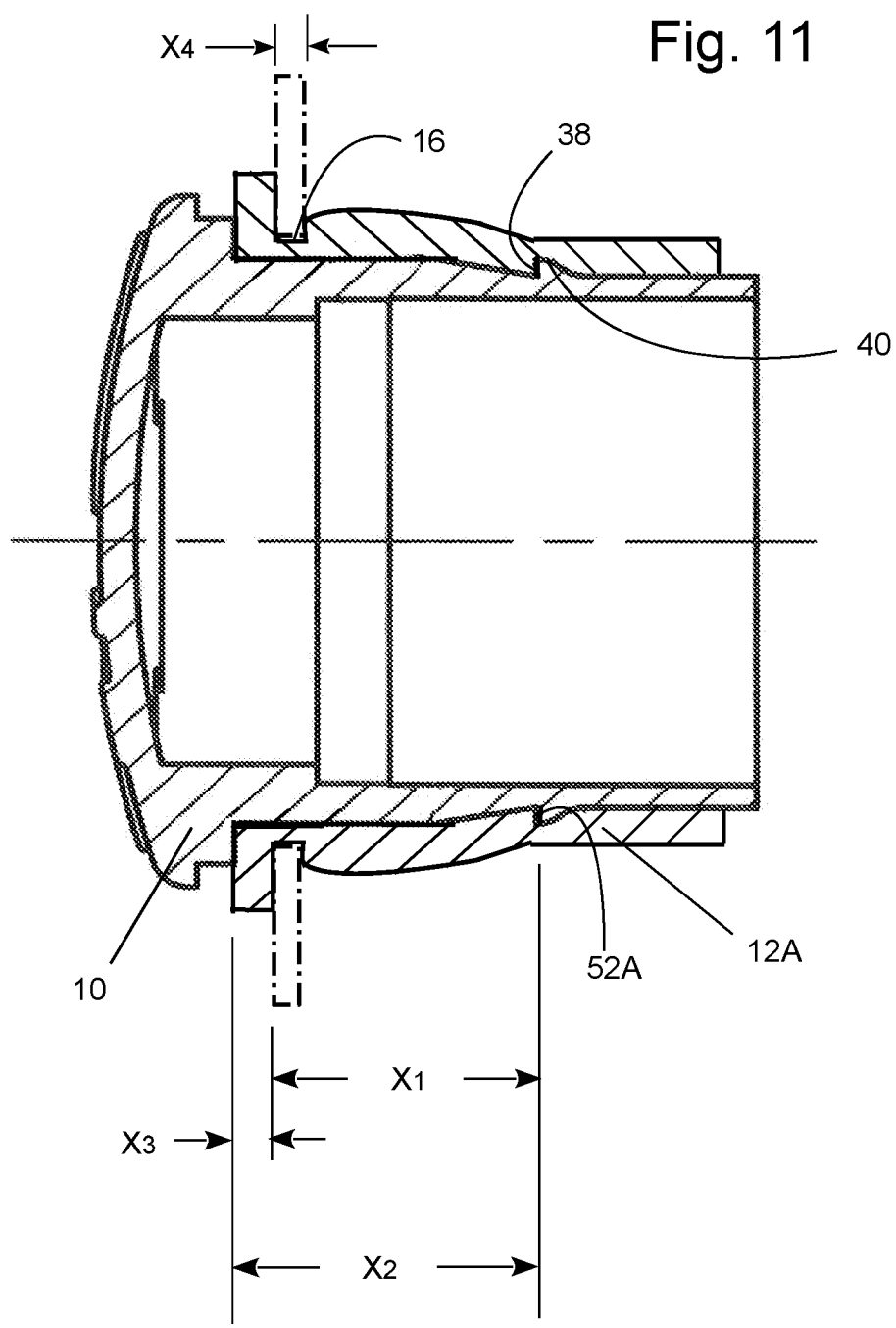

PANEL MOUNT FOR MOUNTING SIGNALLING AND CONTROL DEVICES ON CONTROL PANELS

BACKGROUND OF THE INVENTION

This invention is an improved panel mount for mounting electrical or other devices on panels such as control panels. Various kinds of electronic equipment commonly have control panels on which are mounted various panel mount devices such as audible or visual signaling devices, switches or meters. Many other kinds of machines and equipment, such as vehicles, machine tools, home appliances and farm equipment, also have control panels. Often, instead of a centralized control panel with an instrument cluster, there are multiple, separate, remotely-located panels some even having only a single device mounted on them. A control panel is often mounted to, or is a wall of, a cabinet or other enclosure which contains electronic or mechanical components in order to protect them from the environment or physical contact or to conceal them. Devices that require interaction with human operators but are also connected to the contained electronic or mechanical components are mounted to the panel. The outer side of the panel is accessible to human operators or users and the inner side of the panel faces the contained and protected electronic or mechanical components.

Panels of this type usually have a hole for mounting a panel mount to the panel. The device to be mounted to the panel is normally contained within a panel mount housing that extends through the hole. The panel mount's housing is accompanied by a fastening means for retaining the housing in the hole. One of the most traditional panel mount housings is a tubular housing having a flange at one end and a cylindrical body attached to the flange and threaded. A fastening means for retaining the housing on the panel is a nut that threadedly engages the housing threads. The tubular housing is inserted through the hole in the panel from either the front or the back of the panel. Then the nut is threaded from the opposite side of the panel onto the tubular housing to clamp the housing to the panel. Although that traditional panel mount is effective, it requires simultaneous access to both the front and the back of the panel and requires several manipulative steps in order to mount it to a panel. Additionally, if a gasket is used for sealing or a lock washer is used to prevent rotation of the nut, the traditional panel mount requires three or four parts instead of two.

In order to provide a panel mount that can be installed more easily, simply and less expensively because it requires access to only the outer side of a panel, the prior art provides panel mount housings with resiliently bendable fingers. The fingers are spaced circularly around the housing and oriented generally parallel to a housing central axis. Pushing the housing and its fingers into the hole in the panel deflects the fingers inward toward the axis during insertion. Upon full insertion, the fingers snap radially outward into place and have shoulders that retain the housing in the panel hole. However, many panel mounts of that type do not provide a seal. They often do not tightly hold the panel mount housing rigidly against the panel but instead allow it to wobble in place, especially if the panel mount has been subjected to vibration. Some manufacturers use a spring to prevent wobble but at extreme cold temperatures the spring contracts or distorts and the installed structure wobbles.

It is therefore an object of the invention to provide a panel mount that can be installed with access to only the outer side of a panel yet is retained against withdrawal from the panel, engages the panel in a manner that provides a seal and is tightly held without any wobble.

A further object of the invention is to simplify and reduce the cost of installing panel mounted devices onto a panel by providing a panel mount that can be pre-assembled and then quickly, easily and completely installed with access to only the outer side of the panel by inserting the panel mount into a panel hole and pushing the panel mount inward with a small force in a single linear pushing motion.

A further object of the invention is to simplify the assembly of panel mounted devices onto a panel and reduce manufacturing costs by providing a panel mount that has only two parts It is a further object of the invention to provide a panel mount that combines the above capabilities with sealing that prevents the passage of any fluids between the hole and the panel mount.

SUMMARY OF THE INVENTION

The invention is a panel mount for containing and supporting a device at a hole in a panel. One component of the panel mount is a tubular, resiliently compressible, elastomeric grommet. The grommet has a grommet flange segment at its axially outer end and a tubular grommet body extending axially inward from the grommet's flange segment. The grommet body further includes an exterior surface including a cylindrical hole segment extending axially inward from the grommet flange segment and having a diameter that is substantially the same as the hole diameter. No part of the exterior surface of the grommet body extends radially outward from the grommet axis further than half the diameter of the hole. The grommet body also has an interior surface that includes a bulging segment that is positioned radially inward of at least a portion of the grommet's hole segment. A second component of the invention is a tubular housing that includes a housing flange segment. The housing also has a tubular housing body extending axially inward from the housing flange segment. The tubular housing body has an exterior surface that includes an expander segment. The expander segment and the bulging segment are axially positioned to come into contacting registration when the tubular housing is fully inserted into the grommet so that the expander segment expands the grommet at a position axially inward of the hole.

Preferably, the tubular housing body also includes a tubular male pre-assembly segment on the exterior surface of the tubular housing body. The tubular male pre-assembly segment permits the housing body to be pre-inserted partially into the grommet and into the bulging segment of the grommet without expanding any part of the grommet radially outward.

Preferably, the housing body and the grommet have cooperating structures to provide a withdrawal lock. An axially inward facing shoulder is formed into the interior wall of the grommet and an axially outward facing shoulder projects radially outward from the exterior surface of the housing. Upon completion of installation, these surfaces come into contact and prevent the housing from sliding axially out of the grommet.

There are additional and preferred structural features that will be described.

BRIEF DESCRIPTION OF DRAWINGS

FIG. 11 is a view in axial section that is analogous to the sections of the preferred embodiment and illustrating an alternative embodiment of the invention In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The following description of the invention begins with a description of a terminology convention and definitions that were adopted to describe the preferred embodiments of the invention and their operation during installation. The description of terminology and definitions is followed by an overview description of the preferred embodiments of the invention and their installation. The overview description will identify the principal component parts and fundamentals of their functional cooperation in general terms. Its purpose is to provide a general orientation to the components of the invention and their structural features and to additionally describe the sequence of steps to install an embodiment of the invention in a hole of a control panel. The overview description is followed by a description of more specific and detailed structural characteristics of the component parts of the preferred embodiments of the invention and their functional cooperation during the process of mounting the components on a panel.

Terminology and Definitions

Figure 8:
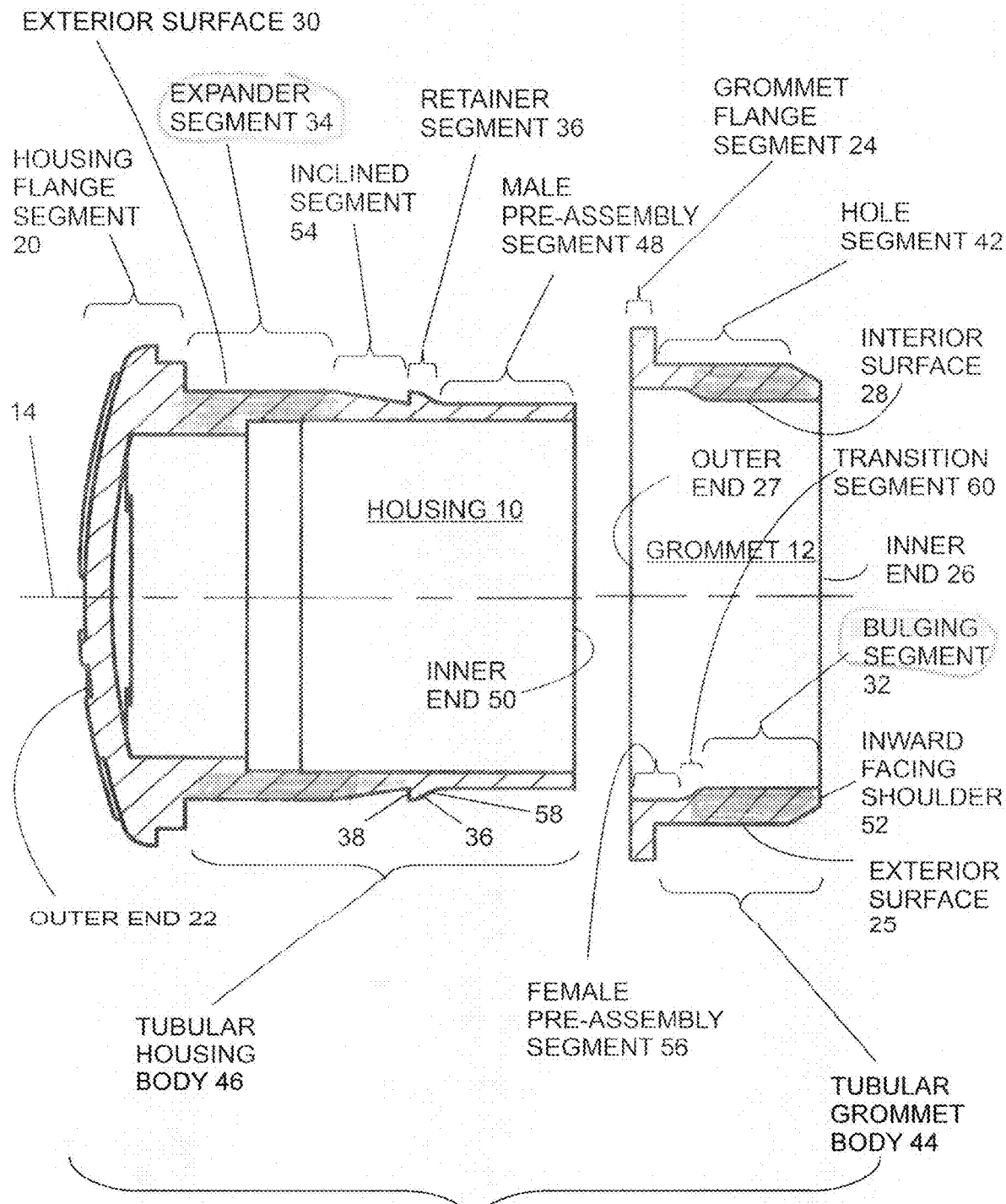
FIG. 8 is an exploded view in axial section of the housing and grommet components of the invention taken substantially along the line A-A of FIGS. 1 and 3 and illustrating the terminology used for describing the preferred embodiment of the invention.

An initial inspection of the drawings shows that an embodiment of the invention has two basic component parts each having structural features of various different shapes, sizes and configurations. These various structural features have diameters, lengths and positions that allow them to cooperate in a manner that accomplishes the improvements of the invention. A terminology convention has been adopted to facilitate describing them and their respective diameters, lengths and positions. The purpose of the terminology is to assist visualization and provide unique, distinguishable names for the structural features. FIG. 8 is provided to facilitate reference to the names adopted for the structural features of the invention.

Figure 5:
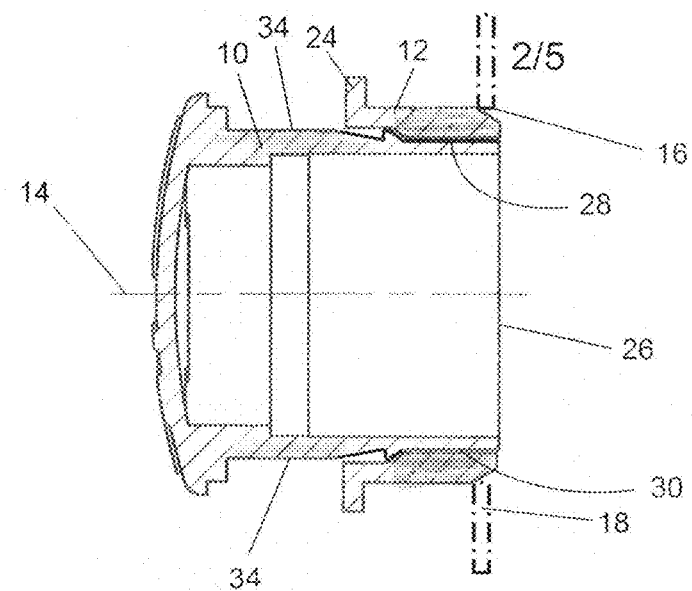
FIG. 5 is a view in axial section of the initial pre-assembled housing and grommet components of the preferred embodiment of the invention taken substantially along the line A-A of FIGS. 1 and 3.
Figure 6:
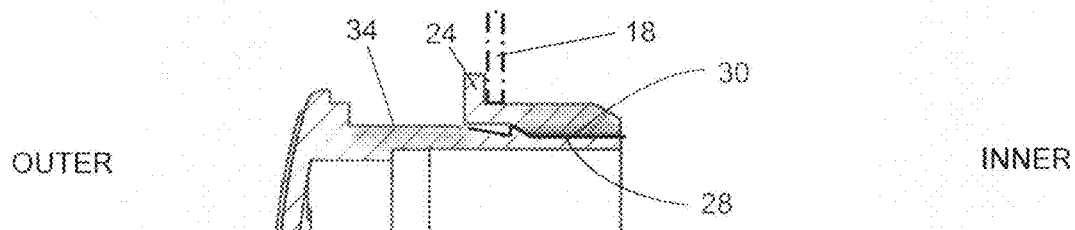
FIG. 6 is a view in axial section of the partially and intermediately assembled housing and grommet components of the preferred embodiment of the invention taken substantially along the line A-A of FIGS. 1 and 3.
Figure 7:
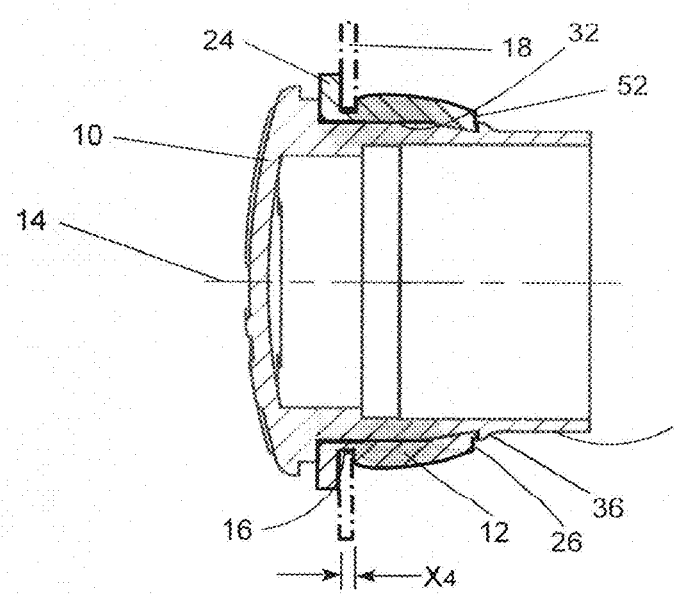
FIG. 7 is a view in axial section of the fully assembled housing and grommet components of the preferred embodiment of the invention taken substantially along the line A-A of FIGS. 1 and 3.

Looking at the drawings, it can be seen that the two basic component parts of the invention are a tubular housing 10 and a tubular grommet 12. The housing 10 and the grommet 12 have a central axis 14. As shown in FIGS. 5-7, the housing 10 becomes inserted in the grommet 12 and together they become inserted in a hole 16 in a panel, such as a control panel 18 shown in phantom. When installed, there is an outer side of the panel which faces toward, and is visible to, a user or operator. There is also an opposite inner side of the panel which, when embodiments of the invention are installed and operable, is usually not visible to the user. The inner and outer sides and directions are labelled on FIG. 7 but are applicable to the other figures.

In order to provide a meaningful terminology convention, directions and positions are described with reference to the directions and positions that exist when the component parts are installed even though, when the components are not installed, they have no relevant position or orientation. This terminology is believed to allow for descriptions that are easier to visualize because the descriptions are related to directions and positions when embodiments of the invention are mounted in their intended position on a panel.

Directions along the central axis are described from the perspective of a human user. Because control panels usually are a wall of a compartment or enclosure and the human user is outside the compartment or enclosure, the usual position of the human user is viewed as outside and the inside of the compartment or enclosure is viewed as inside. Directions and positions toward or nearer the outside are described by the terms "axially outer" and "axially outward". Directions and positions toward the inside are described by the terms "axially inner" and "axially inward". The adjective "axially" refers to directions and positions relative to the direction of the central axis 14.

Other position or direction characteristics of structural features of the component parts are described in terms of "radially inward" and "radially outward". The adjective "radially" refers to directions and positions relative to the direction of radii that extend perpendicularly from the central axis 14. Since the component parts are tubular, they are also described as having an interior surface which is the tube surface that is radially on the inside of the tube and an exterior surface which is the surface that is radially on the outside of the tube.

In addition to the adopted convention for describing positions and directions, an attempt has been made to provide unique names for the structural features of the invention. Many of the names include a word that refers to their function and, when possible, to a word that is commonly used in the art to name or describe similar structures.

Figure 1:
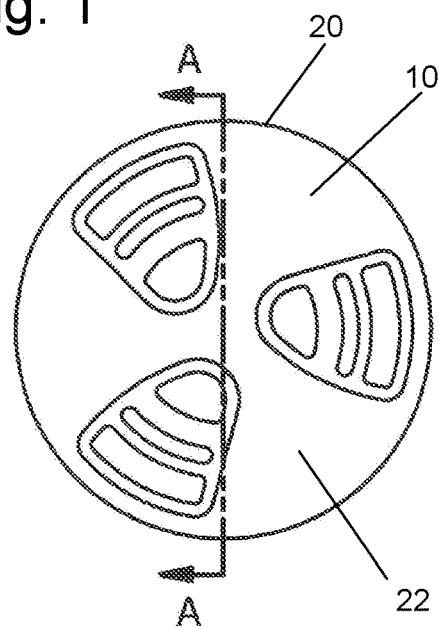
FIG. 1 is a front view of the housing component of the preferred embodiment of the invention.
Figure 2:
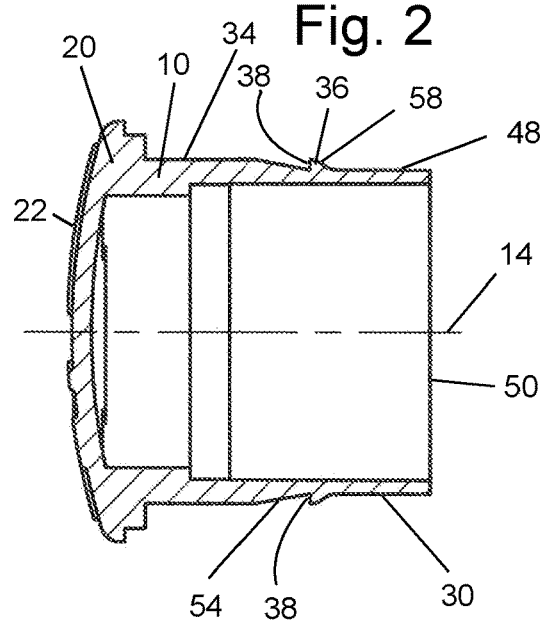
FIG. 2 is a view in axial section of the housing component of FIG. 1 taken substantially along the line A-A of FIG. 1.

Finally, the term "substantially" is used with respect to dimensional characteristics of some of the structural features of the invention's components. As well known to those skilled in the engineering arts, dimensions that most desirably have a particular value can often differ from that particular value by a small amount and yet the variation causes no resulting difference in the operation or effectiveness of an embodiment of an invention. Small dimensional differences from an ideal value often allow operation that is identical to operation when there is no difference. The term "substantially" is used to include differences that are sufficiently small that they do not affect the operation or function of an embodiment. For example, the description of the invention describes inside diameters (ID) that are substantially equal to outside diameters (OD) so that one component can be slid inside another without any meaningful frictional resistance to that insertion and without having to shrink one or expand the other component and yet they are essentially in contact. But if they are not exactly equal so that there is a gap between them, they are still substantially equal if the gap is so small that it does not change the functional or operational characteristics of the invention Overview Of The Preferred Embodiment Of The Invention Referring to FIGS. 1 and 2, one principal component of the preferred embodiment of the invention is a housing 10 which is tubular and has a circular front flange segment 20 surrounding an outer end 22. The housing flange segment 20 is the part of the housing that seats near the human-visible outer side of the control panel so the flange segment's outer end 22 is visible to an operator. The housing 10 is preferably a substantially rigid plastic body.

Figure 3:
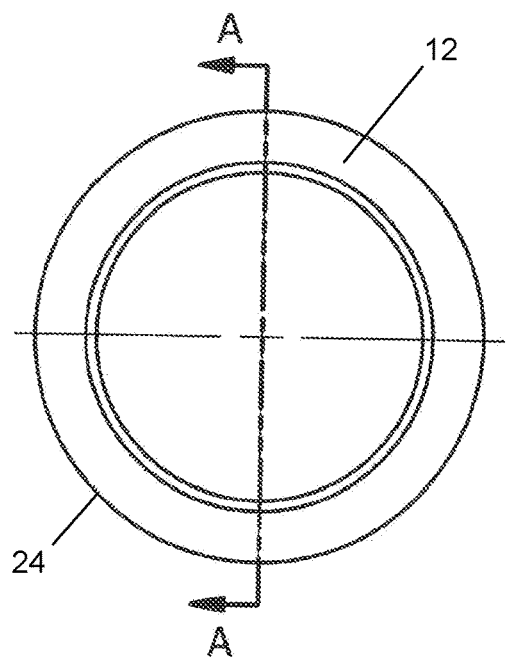
FIG. 3 is a front view of the grommet component of the preferred embodiment of the invention.
Figure 4:
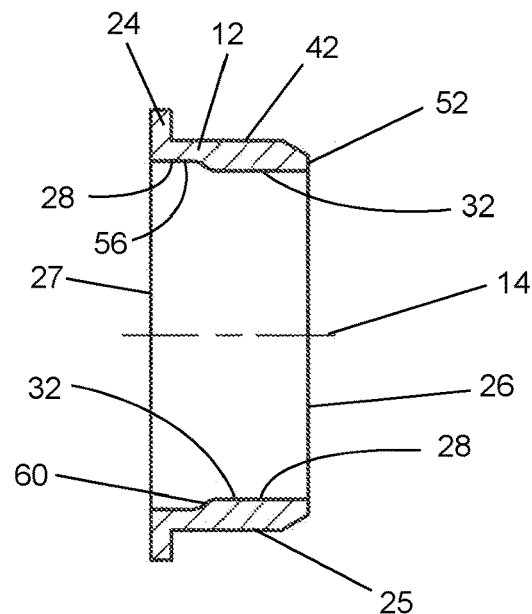
FIG. 4 is a view in axial section of the grommet component of FIG. 3 taken substantially along the line A-A of FIG. 3.

Referring to FIGS. 3 and 4, the second principal component of the preferred embodiment of the invention is a grommet 12 which is tubular and has a grommet flange segment 24 at its outer end 27. Importantly, the grommet 12 is constructed of a resiliently compressible, elastomeric material.

FIGS. 5-7 illustrate the sequence of steps for installing the housing 10 and the grommet 12 into a hole 16 in a panel 18. The housing 10 and the grommet 12 are first preassembled in preparation for mounting them in the hole 16 of the panel 18. To preassemble them, the housing 10 is inserted partially into the grommet 12 in a telescoping relationship as shown in FIG. 5. The interfacing segments of the interior surface 28 of the grommet 12 (see FIG. 8) and of the exterior surface 30 of the housing 10 have substantially the same diameter. Therefore the grommet 12 slides easily, in an axial direction, onto the housing 10 with little or no resistive friction although having little or no space at the interface between them. Therefore in the absence of any substantial forces applied axially to the telescopically assembled housing 10 and grommet 12, they will not fall apart when handled prior to insertion into the hole 16 or when being positioned at the hole 16 in preparation for insertion into the hole 16.

Following initial assembly of the housing 10 into the grommet 12, the inner end 26 of the grommet 12 is placed at the hole 16 in the position illustrated in FIG. 5. The grommet 12 and the housing 10 are then, together as a unit, slid into the hole 16 until the grommet flange segment 24 seats against the outer side of the panel 18 at the position shown in FIG. 6. In order to allow the partially telescoped unit to slide easily into the hole 16 with little or no friction, the exterior surface 25 of the grommet and the hole have substantially the same diameter.

The grommet's flange segment 24 prevents any further insertion of the grommet 12 into the hole 16. The housing 10 is then slid further in the axially inward direction into the grommet 12 until the housing's flange segment 20 seats against the grommet's flange segment 24 at the position shown in FIG. 7. That final stage of insertion causes two things to happen.

Referring to FIG. 8, the grommet 12 has a bulging segment 32 on its interior surface 28 and the housing 10 has an expander segment 34 on its exterior surface 30. The first thing to happen is that the grommet's smaller inside diameter bulging segment 32 slides up onto and over the housing's larger outside diameter expander segment 34 and is therefore expanded radially outward. Consequently the grommet 12 is expanded radially outward behind (axially inward of) the control panel 18 to a diameter that is larger than the diameter of the hole 16. That enlargement retains the grommet 12 against sliding back out of the hole 16.

The second thing that happens during the final stage of insertion is the result of cooperating structures at the inner end of the grommet 12 and on the exterior surface 30 of the housing 10. Those cooperating structures lock the housing 10 against coming out of the grommet 12. To provide the lock, the housing 10 is provided with a retainer segment 36 preferably in the form of an annular locking flange. The length of the grommet 12 is sized so that, at the fully inserted position of FIG. 7, the grommet's inner end 26 functions as a shoulder that seats against a shoulder 38 of the annular locking flange that forms the retainer segment 36 on the housing 10. Therefore the inner end 26 of the grommet 12 prevents the housing 10 from ever sliding out of the grommet 12. However, as an important alternative that is illustrated in FIG. 11, instead of having the end of the grommet seat against the shoulder 38 of the retainer segment 36, the grommet can be made longer but provided with an inner, circular groove 40 formed into its inner cylindrical wall at the fully inserted location of the retainer segment 36 on the housing 10. The retainer segment 36 would enter into the circular groove 40 and similarly lock the housing in place in the same manner.

More Detailed Description

This description refers to all the figures but especially FIG. 8 unless other figures are referenced.

Looking closer at the grommet 12, its flange segment 24, which is positioned at its axially outer end 27, has a radially outer periphery that has a diameter greater than the hole 16 diameter. The remainder of the grommet 12 is a tubular grommet body 44 with an exterior surface 25 and extending axially inward from the grommet's flange segment 24.

The grommet body 44 includes a cylindrical hole segment 42 extending axially inward from the grommet flange segment 24. That hole segment 42 has a diameter that is substantially the same as the hole 16 diameter. Additionally, no part of the exterior surface 25 of the grommet body 44 extends radially outward from the grommet axis 14 any further than half the diameter of the hole 16. This relationship assures that, with the grommet 12 in a relaxed state prior to its expansion, the grommet 12 will slide easily into the hole 16 with little or no resistance to its insertion. The grommet's interior surface 28 includes the bulging segment 32 which is located radially inward of at least a portion of the hole segment 42.

The housing flange segment 20 of the tubular housing 10 has a radially outer periphery at its axially outer end 22 that housing flange segment 20 has a peripheral diameter greater than the hole 16 diameter. The housing 10 also has a tubular housing body 46 that extends axially inward from the housing flange segment 20. The exterior surface 30 of the tubular housing body 46 includes the expander segment 34. The expander segment 34 has a diameter greater than the diameter of the bulging segment 32 on the interior surface 28 of the grommet 12. The expander segment 34 and the bulging segment 32 are axially positioned to come into mutually contacting registration when the tubular housing 10 is fully inserted into grommet 12. Consequently, as the expander segment 34 slides into the bulging segment 32, the expander segment 34 expands the bulging segment 32 radially outward at locations along the grommet 12 that are axially inward of the hole. Upon full insertion of the housing 10 into the grommet 12, the bulging segment 32 has been expanded as shown in FIG. 7.

Both the housing 10 and the grommet 12 are provided with structural features for the purpose of firmly retaining the grommet 12 on the housing 10 while they are pre-assembled but not yet installed and for the purpose of allowing the assembled components to be inserted into the hole 16 to the position illustrated in FIG. 6 without any substantial resistance to its insertion. For those purposes a tubular male pre-assembly segment 48 is formed on the exterior surface 30 of the tubular housing 10. The male pre-assembly segment 48 extends axially outward from the inner end 50 of the housing 10. The male pre-assembly segment 48 has a diameter substantially equal to the diameter of the bulging segment 32 (on the interior surface 28 of the grommet 12) when the grommet is in a relaxed, non-expanded state. As a result, the male pre-assembly segment 48 can be pre-inserted partially into the grommet 12 and into the bulging segment 32 of the grommet 12 without expanding any part of the grommet radially outward. Without any radially outward expansion when pre-assembled, the pre-assembly can be inserted into the hole without any substantial resistance and slid in until the grommet's flange segment 24 seats against the front surface of the panel 16 at the positon shown in FIG. 6.

Figure 10:
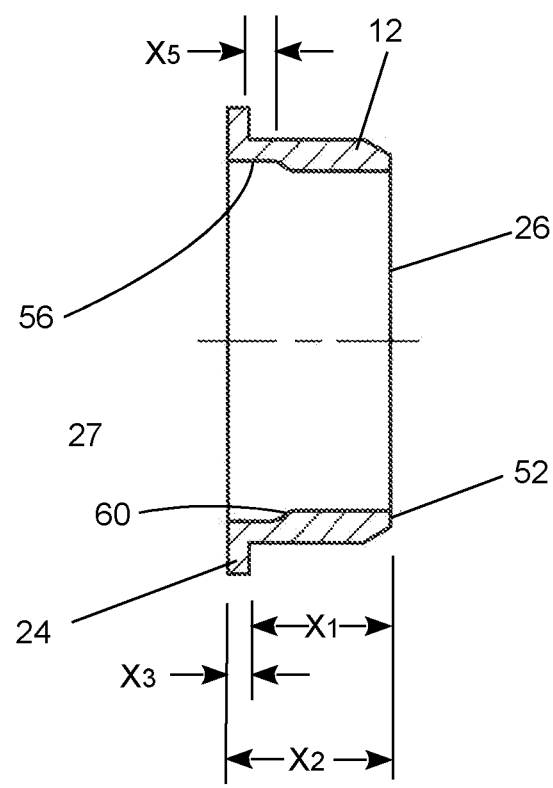
FIG. 10 is a view in axial section of the grommet component of the preferred embodiment of the invention taken substantially along the line A-A of FIG. 3 and illustrating dimensional features of the invention.

The housing 10 and the grommet 12 are also provided with structural features that provide a withdrawal lock to prevent the housing 10 from sliding axially outward with respect to the grommet 12. An axially inward facing shoulder 52 is formed into the interior surface 28 of the grommet 12. On the preferred embodiment, the inward facing shoulder 52 is the inner end 26 of the grommet 12. The inward facing shoulder 52 is axially spaced from the inward facing shoulder of the grommet's flange segment 24 by a distance $X_1$ (see FIG. 10).

Figure 9:
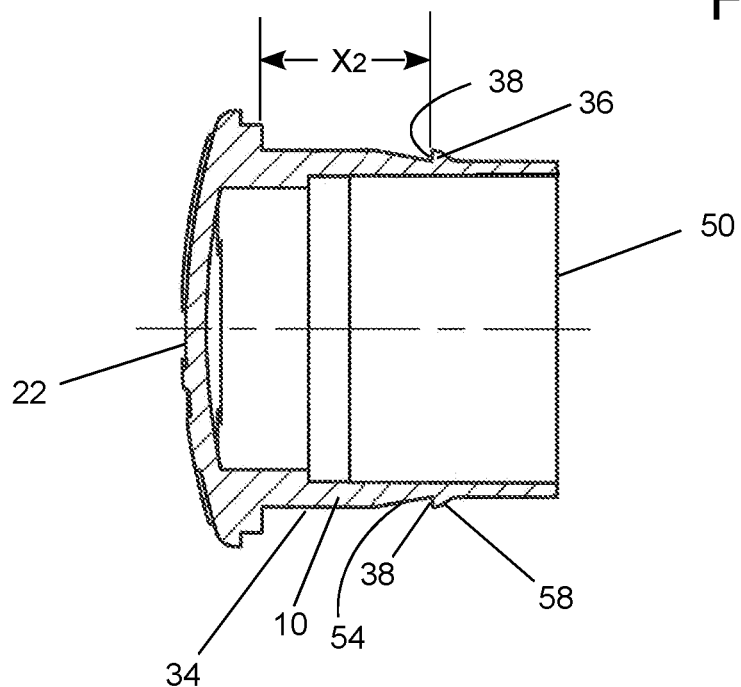
FIG. 9 is a view in axial section of the housing component of the preferred embodiment of the invention taken substantially along the line A-A of FIG. 1 and illustrating dimensional features of the invention.

An axially outward facing shoulder 38 is formed to extend radially outward from the exterior surface 30 of the housing 10. This axially outward facing shoulder 38 is formed on a retainer segment 36 of the housing. The retainer segment 36 is preferably an annular flange surrounding and extending radially outward from the housing 10, although it can alternatively be a series of spaced apart segments of an annular flange. The axially outward facing shoulder 38 is axially spaced from the inward facing shoulder of the housing's flange segment 20 by a distance ($X_2$) (see FIG. 9). That distance ($X_2$) is substantially equal to the sum of $X_1$ and the axial thickness ($X_3$) of the housing's flange segment 20 (see FIG. 10).

Consequently, as illustrated in FIG. 7, when the assembly is pushed entirely into the hole 16, the axially inward facing shoulder 52 of the grommet 12 seats against the axially outward facing shoulder 38 on the retainer segment 36 of the housing 10. These interfacing shoulders prevent axially outward movement of the housing 10 with respect to the grommet 12.

Desirably, the retainer segment 36 has an inclined or frusto-conical axially inward surface 58 to minimize insertion resistance by smoothly guiding the grommet's bulging segment 32 over the retainer segment 36. A frusto-conical inclined segment 54 on the exterior surface 30 of the housing 10 is positioned between the housing's expander segment 34 and its retainer segment 36 for guiding the bulging segment 32 up and onto the expander segment 34.

An alternative but functionally equivalent embodiment of a withdrawal lock is illustrated in FIG. 11. The grommet 12A is longer than the grommet 12 because the grommet has been extended further inward. An annular groove 40 is formed into the interior surface of the grommet 12A. The annular groove 40 has an axially inward facing shoulder 52A. Consequently, when the alternative embodiment of FIG. 11 is fully installed, the outward facing shoulder 38 of the housing 10 seats against the inward facing shoulder 52A to prevent withdrawal of the housing 10.

Returning to the preferred embodiment, preferably the interior surface 28 of the grommet 12 has a female pre-assembly segment 56 extending axially inward from the axially outer end 27 of the grommet 12. The female pre-assembly segment 56 has a diameter that is substantially equal to the diameter of the bulging segment 32 of the interior surface 28 of the grommet 12. The retainer segment 36 of the housing 10 may have a diameter at its periphery that is substantially equal to the diameter of the expander segment 34 of the housing 10.

One result of the dimensional relationships of these diameters is that the housing 10 can be pre-assembled farther into the grommet 12 without any substantial resistance to its insertion. More specifically, the housing 10 can be inserted far enough that the retainer segment 36 is within the grommet 12 and also far enough that the grommet's interior surface 28 at the grommet's outer end 27 is co-linear with the housing's exterior surface 30 at the housing's expander segment 34. As a result, without any expansion of the grommet 12, the grommet's interior surface 28 at the grommet's outer end 27 is already at the diameter of the expander segment 34 making it easier to initiate the entry of the expander segment 34 into the bulging segment 32. These relationships make it easier, during the final installation stage, to push the housing 10 further into the grommet 12 to their final position shown in FIG. 7.

Another result of the diameter relationships is to avoid a problem that could arise because the radial gap is very thin between the exterior surface of the housing's expander segment 34 and the radially inward facing boundary of the hole. As previously explained, the purpose of the expander segment 34 of the housing 10 is to expand the grommet 12 radially outward by a substantial distance immediately axially inward of the panel 18. However, the radial gap between the hole and the housing 10 is so thin that any substantial radially outward expansion of the grommet 12 by the expander segment 34 at that radial gap during insertion would cause a substantial increase in the frictional resistance to insertion. The reason is that, at that radial gap, the grommet material is so thin that a small amount of radially outward compression by the expander segment 34 would squeeze the grommet material as far as it could be compressed and result in increased resistance to insertion. Because of the female pre-assembly segment 56, the expander segment 34 of the housing 10 does not expand the grommet 12 radially outward at the hole. To accomplish that, the female pre-assembly segment 56 has an axial length ($X_5$) at least equal to the sum of the axial length ($X_3$) of the grommet's flange segment 24 (see FIG. 10) and the thickness ($X_4$) of the panel 18 (see FIG. 7). The dimensional relationships that have been described provide the advantageous result that, with the components fully assembled, the segment of the grommet 12 between the hole 16 and the housing 10 is not in a compressed state.

It is also desirable to provide a frusto-conical transition segment 60 that is positioned on the interior surface 28 of the grommet 12 extending between and blending together the female pre-assembly segment 54 and the bulging segment 32. This transition segment 60 helps guide the retainer segment 36 and the expander segment 34 of the housing's exterior surface 30 over and onto the bulging segment 32.

REFERENCE NUMBER LISTING 10 tubular housing
12 tubular grommet
12A alternative tubular grommet
14 central axis
16 hole in control panel
18 control panel
20 flange segment of housing
22 Outer face of housing flange segment
24 flange segment of grommet
25 exterior surface of grommet
26 inner end of grommet
27 outer end of grommet
28 interior surface of grommet
30 exterior surface of housing
32 bulging segment of grommet
34 expander segment of housing
36 retainer segment of housing
38 shoulder of retainer segment
40 inner groove in the inner surface the grommet
42 hole segment of the grommet
44 tubular grommet body
46 tubular housing body
48 male pre-assembly segment
50 inner end of housing
52 axially inward facing shoulder of preferred grommet
52A axially inward facing shoulder of alternative grommet
54 inclined segment of housing
56 female pre-assembly segment of the grommet
58 inclined surface of retainer segment 36
60 frusto-conical transition segment of grommet This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A panel mount for containing and supporting a device at a hole in a panel having a thickness, the panel having an outer side facing a user and an oppositely facing inner side and the hole having a hole diameter, the panel mount comprising:
   (a) a tubular, resiliently compressible, elastomeric grommet having a central axis, the grommet including a grommet flange segment at an axially outer end with a periphery diameter greater than the hole diameter, the grommet including a tubular grommet body extending axially inward from the grommet's flange segment, the grommet body further including
      (ii) an exterior surface including a cylindrical hole segment extending axially inward from the grommet flange segment by at least the thickness of the panel and having a diameter that is substantially the same as the hole diameter, no part of the exterior surface of the grommet flange extending radially outward from the grommet axis further than half the diameter of the hole; and
      (iii) an interior surface including a bulging segment that is radially inward of the hole segment, the bulging segment having a diameter; and
   (b) a tubular housing having
      (i) a housing flange segment having a radially outer periphery at an axially outer end with a periphery diameter greater than the hole diameter;
      (ii) a tubular housing body extending axially inward from the housing flange segment, the tubular housing body having an exterior surface that includes an expander segment having a diameter greater than the diameter of the bulging segment of the interior surface of the grommet; and
   (c) wherein the expander segment and the bulging segment are axially positioned to come into contacting registration with the tubular housing fully inserted into the grommet and the bulging segment positioned radially outwardly of the expander segment to expand the grommet only at a position axially inward of the hole.

2. A panel mount according to claim 1 wherein the panel mount further comprises:
   a tubular male pre-assembly segment on the exterior surface of the tubular housing body and extending axially outward from an inner end of the tubular housing body, the male pre-assembly segment having a diameter substantially equal to the diameter of the bulging segment of the interior surface of the grommet to permit the male pre-assembly segment of the housing to be pre-inserted partially into the grommet and into the bulging segment of the grommet without expanding any part of the grommet radially outward.

3. A panel mount according to claim 2 wherein the panel mount further includes a withdrawal lock comprising:
   (a) an axially inward facing shoulder formed into the interior wall of the grommet and axially spaced from an inward facing shoulder of the grommet's flange segment by a distance $X_1$ ; and
   (b) an axially outward facing shoulder extending radially outward from the exterior surface of the housing and axially spaced from an inward facing shoulder of the housing's flange segment by a distance ($X_2$) that is the sum of $X_1$ and an axial thickness ($X_3$) of the housing's flange segment.

4. A panel mount according to claim 3 wherein the inward facing shoulder formed into the interior wall of the grommet is an inner end of the grommet.

5. A panel mount according to claim 3 wherein the inward facing shoulder formed into the interior wall of the grommet is a wall of a groove.

6. A panel mount according to claim 3 wherein the outward facing shoulder extending outward from the exterior surface of the housing is a shoulder of an annular flange surrounding the housing and a frusto-conical inclined segment of the exterior surface of the housing is positioned between the expander segment of the housing and the annular flange for guiding the bulging segment onto the expanding segment.

7. A panel mount according to claim 3 wherein the interior surface of the grommet has a female pre-assembly segment extending axially inward from an axially outer end of the grommet, the female pre-assembly segment having a diameter that is substantially equal to the diameter of the bulging segment of the interior surface of the grommet, and wherein a frusto-conical transition segment is positioned on the interior surface of the grommet between the female pre-assembly segment and the bulging segment for guiding the bulging segment over and onto the expander segment of the housing exterior surface.

8. A panel mount according to claim 7 wherein the female pre-assembly segment has an axial length equal to or greater than the sum of an axial length ($X_3$) of the grommet's flange segment and a thickness ($X_4$) of the panel surrounding the hole.

9. A panel mount according to claim 3 wherein the inward facing shoulder formed into the interior wall of the grommet is an inner end of the grommet, wherein the outward facing shoulder extending outward from the exterior surface of the housing is a shoulder of an annular flange surrounding the housing and a frusto-conical inclined segment of the exterior surface of the housing is positioned between the expander segment of the housing and the annular flange for guiding the bulging segment onto the expanding segment and wherein the interior surface of the grommet has a female pre-assembly segment extending axially inward from an axially outer end of the grommet, the female pre-assembly segment having a diameter that is substantially equal to the diameter of the bulging segment of the interior surface of the grommet, and wherein a frusto-conical transition segment is positioned on the interior surface of the grommet between the female pre-assembly segment and the bulging segment for guiding the bulging segment over and onto the expander segment of the housing exterior surface.

10. A panel mount according to claim 9 wherein the female pre-assembly segment has an axial length substantially equal to the sum of an axial length ($X_4$) of the grommet's flange segment and a thickness ($X_5$) of the panel surrounding the hole.

* * * * *